(12) United States Patent
Rosson (10) Patent No.: US 9,964,710 B2
(45) Date of Patent: May 8, 2018

(54) TUNABLE OPTICAL FIBER CONNECTOR AND TUNING METHODS FOR OPTICAL FIBER CABLE ASSEMBLIES

(71) Applicant: Corning Optical Communications LLC, Hickory, NC (US)

(72) Inventor: Joel Christopher Rosson, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/455,414

(22) Filed: Mar. 10, 2017

(65) Prior Publication Data

US 2017/0269307 A1 Sep. 21, 2017

Related U.S. Application Data

(60) Provisional application No. 62/309,600, filed on Mar. 17, 2016.

(51) Int. Cl.
| | |
|---|---|
| *G02B 6/36* | (2006.01) |
| *G02B 6/38* | (2006.01) |
| *G01B 11/27* | (2006.01) |

(52) U.S. Cl.
CPC .......... *G02B 6/3869* (2013.01); *G02B 6/385* (2013.01); *G02B 6/387* (2013.01); *G02B 6/3871* (2013.01); *G01B 11/27* (2013.01); *G02B 6/3843* (2013.01)

(58) Field of Classification Search
CPC ....... G02B 6/3869; G02B 6/385; G02B 6/387
See application file for complete search history.

(56) References Cited

U.S. PATENT DOCUMENTS

| | | |
|---|---|---|
| 4,795,229 A | 1/1989 | Abendschein et al. |
| 5,212,752 A | 5/1993 | Stephenson et al. |
| 5,245,683 A | 9/1993 | Belenkiy et al. |

(Continued)

FOREIGN PATENT DOCUMENTS

| | | |
|---|---|---|
| EP | 0602958 B1 | 3/1999 |
| EP | 1394585 A2 | 8/2003 |

(Continued)

OTHER PUBLICATIONS

PCT International Search Report, PCT/US2015/057967, dated Oct. 29, 2015, 5 pages.

(Continued)

*Primary Examiner* — Sung Pak (57) ABSTRACT

A tunable optical fiber connector for use with an optical fiber cable that supports an optical fiber is disclosed. The connector includes a ferrule, an inner housing and an outer housing. The ferrule has a diameter dF, an outer surface, and an axial bore configured to operably support a bare fiber portion of the optical fiber. The inner housing has an interior and a front-end section that defines a front end of the inner housing. The interior of the inner housing supports the ferrule so that the ferrule front end extends beyond the inner housing front end by a distance DF, wherein dF≤DF≤4·dF. The outer housing has an interior configured to receive the inner housing in one of at least four possible orientations of the inner housing. Cable assemblies and sub-assemblies, as well as connector sub-assemblies, are also disclosed.

22 Claims, 7 Drawing Sheets

(56) References Cited

U.S. PATENT DOCUMENTS

| | | | |
|---|---|---|---|
| 5,329,603 A | 7/1994 | Watanabe et al. |
| 5,367,372 A | 11/1994 | Divita et al. |
| 5,390,272 A | 2/1995 | Repta et al. |
| 5,425,120 A | 7/1995 | Peterson et al. |
| 5,475,782 A | 12/1995 | Ziebol |
| 5,692,268 A | 12/1997 | Case |
| 5,768,455 A | 6/1998 | Konik |
| 5,781,681 A | 7/1998 | Manning |
| 5,991,058 A | 11/1999 | Feuer et al. |
| 6,374,022 B1 | 4/2002 | Parmigiani et al. |
| 6,382,844 B1 | 5/2002 | Dubois et al. |
| 6,428,215 B1 * | 8/2002 | Nault | G02B 6/3843 385/78 |
| 6,464,402 B1 * | 10/2002 | Andrews | G02B 6/381 385/134 |
| 6,464,403 B1 | 10/2002 | Koch et al. |
| 6,498,876 B1 | 12/2002 | Liu et al. |
| 6,604,861 B2 | 8/2003 | Chen et al. |
| 6,629,782 B2 * | 10/2003 | McPhee | G02B 6/3843 385/76 |
| 6,663,293 B2 * | 12/2003 | Lampert | G02B 6/3843 385/139 |
| 6,688,782 B1 | 2/2004 | Dean, Jr. et al. |
| 6,695,489 B2 * | 2/2004 | Nault | G02B 6/3843 385/78 |
| 6,856,750 B2 | 2/2005 | Chang |
| 6,886,990 B2 | 5/2005 | Taira et al. |
| 6,932,515 B2 | 8/2005 | Ngo |
| 7,490,997 B2 | 2/2009 | Verhagen |
| 8,348,516 B2 | 1/2013 | Roth |
| 8,376,632 B2 | 2/2013 | Blackburn et al. |
| 8,403,570 B2 | 3/2013 | Fisher et al. |
| 8,801,301 B2 | 8/2014 | Bradley et al. |
| 8,858,089 B2 | 10/2014 | Bradley et al. |
| 9,069,143 B2 | 6/2015 | Bradley et al. |
| 9,551,842 B2 | 1/2017 | Theuerkorn |
| 2001/0012428 A1 | 8/2001 | **Nakajima et al. |
| 2002/0181893 A1 | 12/2002 | White et al. |
| 2004/0131316 A1 | 7/2004 | Manning et al. |
| 2005/0232554 A1 | 10/2005 | Zimmel et al. |
| 2010/0322568 A1 | 12/2010 | Zimmel et al. |
| 2011/0002586 A1 | 1/2011 | Nhep |
| 2012/0301085 A1 | 11/2012 | Grinderslev |
| 2013/0266279 A1 | 10/2013 | Nishioka et al. |
| 2014/0050446 A1 | 2/2014 | Chang |
| 2014/0068913 A1 | 3/2014 | Zimmel et al. |
| 2014/0105547 A1 | 4/2014 | Baca et al. |
| 2015/0050002 A1 | 2/2015 | Yoshizaki |
| 2015/0177097 A1 | 6/2015 | Clarke et al. |
| 2016/0131851 A1 | 5/2016 | Theuerkorn |
| 2016/0131852 A1 | 5/2016 | Theuerkorn |

FOREIGN PATENT DOCUMENTS

| | | |
|---|---|---|
| EP | 1443350 A2 | 1/2004 |
| JP | 5297246 A | 11/1993 |
| JP | 8106028 A | 4/1996 |
| JP | 03133910 B2 | 2/2001 |
| JP | 03305149 B2 | 7/2002 |
| JP | 2006259631 A | 9/2006 |
| WO | 2012125840 A2 | 9/2012 |
| WO | 2015016897 A1 | 2/2015 |

OTHER PUBLICATIONS

PCT International Search Report, PCT/US2015/057970, dated Oct. 29, 2015, 5 pages.

PCT International Search Report, PCT/US2016/013315, dated Apr. 19, 2016, 5 pages.

International Search Report and Written Opinion PCT/US2017/021723 Dated Jun. 19, 2017.

* cited by examiner

TUNABLE OPTICAL FIBER CONNECTOR AND TUNING METHODS FOR OPTICAL FIBER CABLE ASSEMBLIES

PRIORITY

This application claims the benefit of priority of U.S. Provisional Application No. 62/309,600, filed on Mar. 17, 2016, the content of which is relied upon and incorporated herein by reference in its entirety.

FIELD

The present disclosure relates to optical fiber connectors, and in particular relates to tunable optical fiber connectors and tuning methods for such tunable optical fiber connectors used for optical fiber cable assemblies.

BACKGROUND

Optical fiber connectors ("connectors") are devices used to optically connect one optical fiber to another, or to connect an optical fiber to another device such as an optical transmitter or an optical receiver. An optical fiber cable typically carries the optical fiber. The connector and the optical fiber cable constitute a cable assembly. The connector is typically formed by engaging an inner housing with an outer housing, wherein the inner housing supports a ferrule.

An important property of a connector is its ability to provide an efficient optical connection, i.e., an optical connection whereby the optical loss (also called "insertion loss") due to the connection is minimal. This efficiency is referred to in the art as the "coupling efficiency."

It is advantageous to "tune" the connectors in the factory to minimize optical loss in the field. The tuning process involves measuring the core-ferrule concentricity, i.e., the offset between the optical fiber core and the true center of the ferrule in which the optical fiber is supported. In one example, tuning a single fiber optical connector is usually performed by a contact method in which the connector being tuned is mated to a master connector whose fiber core position is known. The tuning can also be performed using other contact methods that do not involve making a connection to a master connector. In other examples, non-contact methods can be employed.

The contact methods that do not involve making a connection to a master connector and the non-contact methods typically require a substantial portion of the outer surface of the ferrule to be exposed. Because the inner housing in most connector designs covers substantially all (e.g., about 90%) of the ferrule length, these measurement methods normally require the core-ferrule concentricity to be measured without the inner housing in place. Accommodating such a requirement in cable assembly processes can add costs, complexities, and/or inefficiencies.

SUMMARY

An embodiment of the disclosure includes a tunable optical fiber connector for use with an optical fiber cable that supports an optical fiber. The optical fiber connector includes: a ferrule having a front end, a back end, a diameter dF, an outer surface, and an axial bore configured to operably support a bare fiber portion of the optical fiber. The optical fiber connector also has an inner housing that has an interior and a front-end section that defines a front end of the inner housing. The interior of the inner housing operably supports the ferrule so that that the front end of the ferrule extends beyond the front end of the inner housing by a distance DF, wherein dF≤DF≤4·dF. The optical fiber connector also has an outer housing having interior configured to receive the inner housing in one of at least four possible orientations of the inner housing relative to a longitudinal axis of the optical fiber connector.

Another embodiment of the disclosure is a cable assembly that includes an optical fiber cable that supports an optical fiber, and the tunable optical fiber connector as described above and installed on the optical fiber cable. A bare fiber portion of the optical fiber is supported by the axial bore of the ferrule.

Another embodiment of the disclosure is a method of tuning an optical fiber connector for use with an optical fiber cable that supports an optical fiber having a core. The method includes: (a) operably supporting a ferrule in an interior of an inner housing, the ferrule having a diameter dF, an outer surface, and an axial bore that operably supports a bare fiber portion of the optical fiber, wherein a front end of the ferrule extends beyond the inner housing by a distance DF to define a front-end section of the ferrule, and wherein dF≤DF≤4·dF; (b) performing a measurement of a position of the core of the optical fiber relative to a center the ferrule using the front-end section of the ferrule; and (c) receiving the inner housing in an interior of an outer housing to form the optical connector, wherein the inner housing is received in the interior of the outer housing in one of at least four possible orientations relative to a longitudinal axis of the optical fiber connector, and wherein the one orientation is selected such that the position of the core of the optical fiber is closest to a keying feature of the outer housing.

Another embodiment of the disclosure is an optical fiber connector sub-assembly for use with an optical fiber cable that supports an optical fiber having a core. The sub-assembly includes: a ferrule having a front end, a back end, a diameter dF, an outer surface, and an axial bore configured to operably support a bare fiber portion of the optical fiber. The sub-assembly also includes an inner housing having an interior and a front-end section that defines a front end of the inner housing. The interior of the inner housing operably supports the ferrule so that that the front end of the ferrule extends beyond the front end of the inner housing by a distance DF, wherein dF≤DF≤4·dF.

Another embodiment of the disclosure is the optical fiber sub-assembly as described above, wherein the front-end section of the inner housing includes at least four sides that render the front-end section of the inner housing at least four-fold symmetric relative to a longitudinal axis of the optical fiber connector sub-assembly. In an example, the at least four sides of the inner housing are substantially identical. In other embodiments there may be more than four sides and more than four-fold symmetry.

Another embodiment of the disclosure is a cable sub-assembly that includes an optical fiber cable that supports an optical fiber. The cable sub-assembly also includes the optical fiber connector sub-assembly described above installed on the optical fiber cable. A bare fiber portion of the optical fiber is supported by the axial bore of the ferrule.

Yet another embodiment of the disclosure is a cable assembly that includes the cable sub-assembly as described above, and an outer housing having interior that receives the front-end section of the inner housing in one of at least four possible orientations.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Optical Fiber Connector Sub-Assembly

Figure 1:
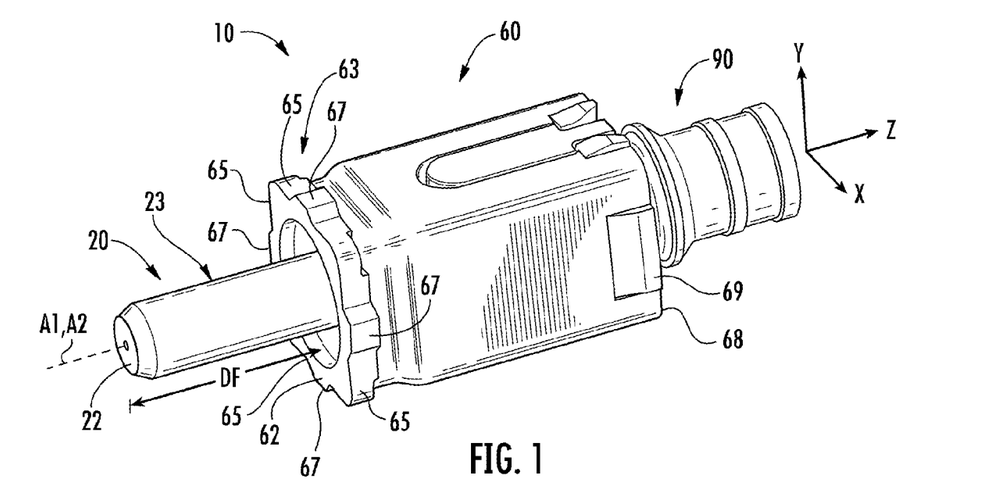
FIG. 1 is a perspective view of an example connector sub-assembly as disclosed herein, showing how a ferrule has a front-end section that extends relatively far beyond a front end of an inner housing as indicated by a distance DF.
Figure 2:
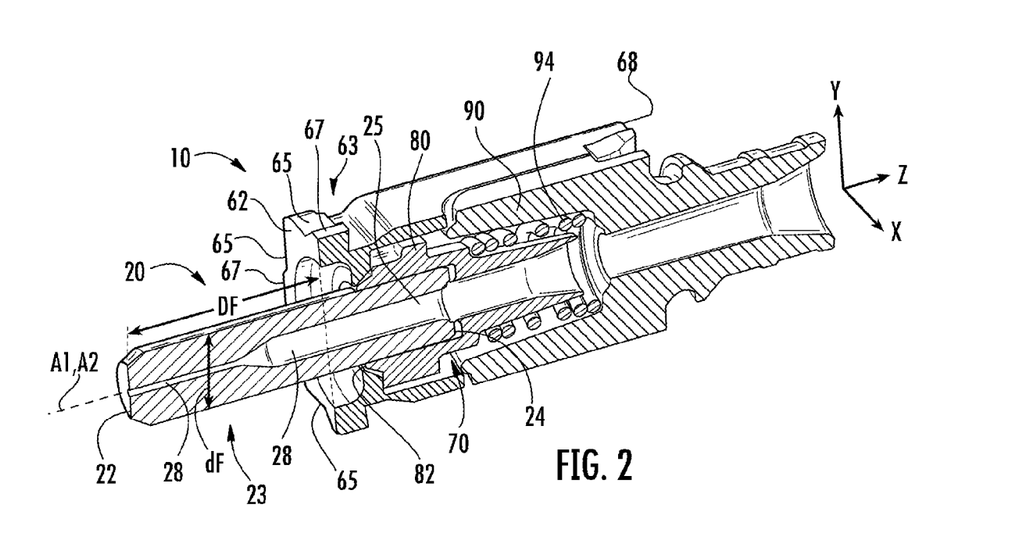
FIG. 2 is a cross-sectional view in the y-z plane of the connector sub-assembly of FIG. 1.

FIG. 1 is a perspective view and FIG. 2 is a central cross-sectional view (y-z plane) of an example optical fiber connector subassembly ("connector sub-assembly") 10 that operably supports a ferrule 20. Although the connector sub-assembly 10 is shown in the form of a sub-assembly for an SC-type optical connector, the principles described below may be applicable to different connector designs.

Figure 3:
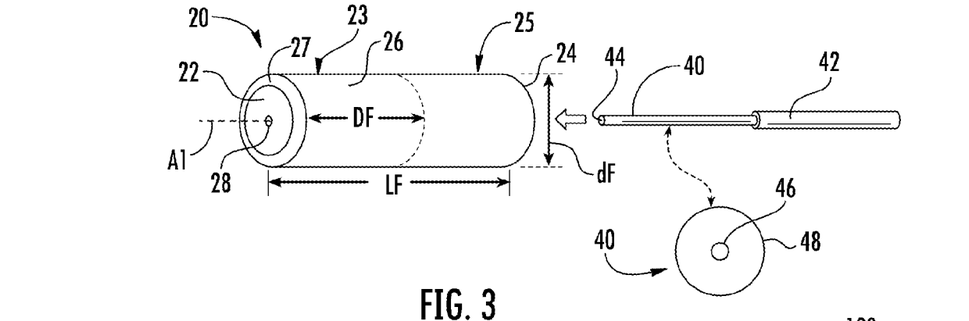
FIG. 3 is a schematic view of an example ferrule that is part of the connector sub-assembly of FIG. 1, showing the front-end section distance DF as well as an overall ferrule length and a diameter dF, and also showing how an optical fiber with a bare fiber section can be inserted into a bore of the ferrule.

FIG. 3 is a schematic view of an example ferrule 20. The ferrule 20 is substantially cylindrical and has a front end 22, a back end 24, an outer surface ("ferrule outer surface") 26, and a substantially central axial bore 28 that has a central axis A1. The ferrule 20 has a front-end section 23 adjacent front end 22 (front-end section 23 also defines front end 22), and a back-end section 25 adjacent back end 24 (back-end section 25 also defines back end 24). The ferrule 20 has an axial length LF between the front and back ends 22, 24 (e.g., measured along central axis A1) and a diameter dF in a plane perpendicular to central axis A1 (see FIG. 2).

The axial bore 28 is nominally centered on the true center of ferrule 20, i.e., to within a manufacturing tolerance, e.g., 1 micron (µm). In an example, ferrule 20 includes a beveled section 27 at the front end 22 adjacent ferrule outer surface 26. The beveled section 27 transitions from the diameter of the front end 22 to the diameter of the ferrule outer surface 26, which corresponds to dF. Axial bore 28 is sized to hold a bare optical fiber section ("bare fiber section") 40 formed at an end of an optical fiber 42. Bare fiber section 40 has a front end 44 that resides at front end 24 of ferrule 20, and includes a central core ("core") 46 surrounded by a cladding 48.

With reference again to FIGS. 1 and 2, connector sub-assembly 10 includes an inner housing (sometimes referred to as simply "housing" or "connector body") 60 having a front end 62, a back end 68, an interior 70, and a housing axis A2. The inner housing 60 has a substantially square cross-sectional shape in the embodiment shown. The back end 68 includes at least one retention member 69, whose function is described below. The inner housing 60 has a front-end section 63, which in an example is in the form of a flange that defines front end 62 and that also includes four sides 65, with each side including an alignment feature 67. The four alignment features 67 are each shown as protrusions, i.e., as male alignment features. In other embodiments, front-end section 63 may not be in the form of flange and/or may include a different number of sides.

In the example shown, front-end section 63 of inner housing 60 has a generally square cross-sectional shape and the symmetry of four sides 65 of the front-end section makes the inner housing 60 "quad" symmetric or "four-fold" symmetric about the housing axis A2. As discussed in greater detail below, inner housing 60 is configured to be received in an interior of an outer housing in one of four possible orientations corresponding to the four-fold symmetry.

The interior 70 of inner housing 60 operably supports ferrule 20 so that front end 24 extends beyond a front end a front end 62 of the inner housing. For example, in the embodiment shown, interior 70 receives a ferrule holder 80 that resides along housing axis A2. Ferrule holder 80 has an open front end 82 that holds ferrule 20 at back-end section 25 so that front-end section 23 of ferrule 20 extends well beyond front end 62 of inner housing 60. Ferrule holder 80 is supported within a retention body 90 (also referred to as a crimp body in some embodiments) that engages inner housing 60 at the back end 68 and that extends into interior 70 of inner housing 60. A bias member in the form of a spring 94 resides in the interior 70 of inner housing 60 and surrounds a rear-end portion of ferrule holder 80. An epoxy or other bonding agent is used to hold bare fiber section 40 within bore 28 of ferrule 20 and/or to hold optical fiber 42 in place within ferrule holder 80. The front end 22 of ferrule 20 extends a distance DF from front end 62 of inner housing 60 (e.g.; measured along central axis or housing axis A2). The distance DF can also be considered as the axial length of front-end section 23 of ferrule 20.

Figure 4A:
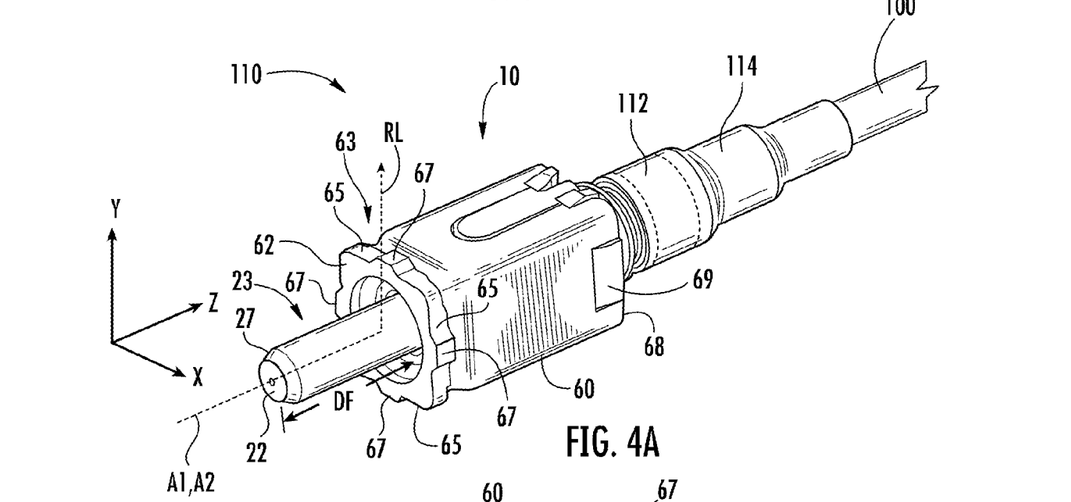
FIG. 4A is similar to FIG. 1 and shows the connector sub-assembly operably connected to an end of an optical fiber cable to form a cable sub-assembly.

FIG. 4A is similar to FIG. 1 and shows connector sub-assembly 10 operably connected to an end of an optical fiber cable 100 to form a cable sub-assembly 110. A crimp band 112 (see also FIG. 6A) and a jacket-retention member 114 (e.g., a heat shrink tube) are used to secure optical fiber cable 100 to connector sub-assembly 10. Alternative methods of securing optical fiber cable 100 to connector sub-assembly are also possible. The optical fiber cable 100 carries optical fiber 42, and bare fiber section 40 of optical fiber 42 resides within axial bore 28 of ferrule 20 (see FIG. 3). The ferrule 20 is rotationally fixed with respect to inner housing 60.

There are a number of manufacturing errors that may result in core 46 of bare fiber section 40 being off-center with respect to a true center of ferrule 20. The degree to which core 46 and the true center of ferrule 20 are aligned is called the core-ferrule concentricity. Here, the term "concentricity" relates to the fact that the true ferrule center is typically measured with reference to ferrule outer surface 26.

The manufacturing errors that give rise to errors in the core-ferrule concentricity can include: (1) an offset of core 46 relative to cladding 48; (2) an offset of bare fiber section 40 within axial bore 28; and (3) an offset (non-centering) of axial bore 28 relative to the true ferrule center of ferrule 20 (again, based on ferrule outer surface 26). These errors tend to be random so that the precise location of core 46 relative to the true ferrule center in a given cable sub-assembly 110 is typically not known unless it is measured.

An aspect of the connector tuning methods disclosed herein includes measuring the core-ferrule concentricity. Note that front-end section 23 of ferrule 20 extends well beyond front end 62 of inner housing 60 by distance DF. In an example, the distance DF is between 25% and 50% of the total length LF of ferrule 20, while in another example, is between 35% and 50% of the total length LF (see FIG. 2). In other words, in an example, $0.25 \cdot LF \leq DF \leq 0.5 \cdot LF$, while in another example $0.35 \cdot LF \leq DF \leq 0.5 \cdot LF$. In another example, distance DF is in the range $dF \leq DF \leq 4 \cdot dF$. Thus, in such an example, when the diameter dF of ferrule 20 is 2.5 mm, the distance DF may be between 2.5 mm and 10 mm.

This relatively large distance DF provides access to ferrule outer surface 26 so that an accurate measurement of the core-ferrule concentricity can be made, as described below. The position (location) of core 46 relative to the true center of ferrule 20 can be identified relative to some reference on inner housing 60, e.g., relative to a reference line RL that runs in the y-direction ("twelve o'clock"), as shown in FIG. 4A.

Figure 4B:
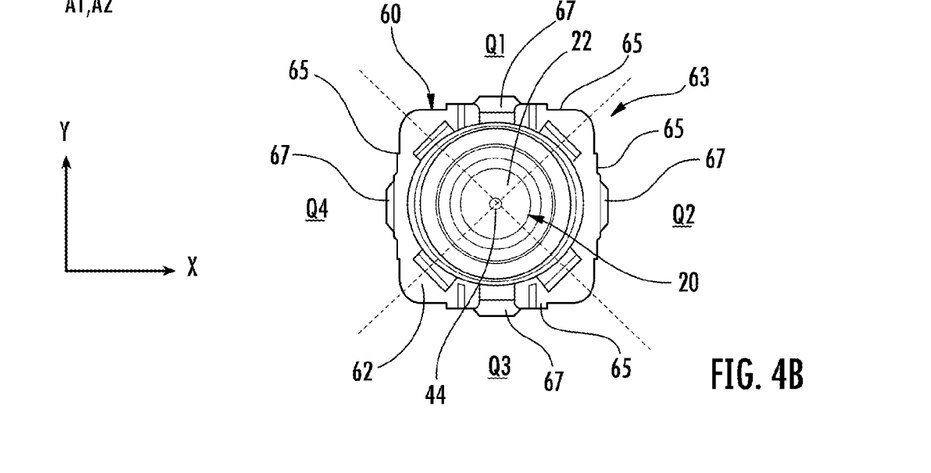
FIG. 4B is a front elevation view of the cable sub-assembly of FIG. 4A, illustrating how the cable sub-assembly can be divided into quadrants so that a measured core position of an optical fiber in the optical fiber cable can be assigned to one of the quadrants.

FIG. 4B is a front elevation view of connector sub-assembly 110 and illustrates an example of how a measurement of core-ferrule concentricity can establish the location of core 46 to be within one of four quadrants Q of inner housing 60, namely quadrants Q1, Q2, Q3 and Q4, with each quadrant spanning an angular range of 90 degrees.

Optimum Arrangement for the Connector

Figure 5A:
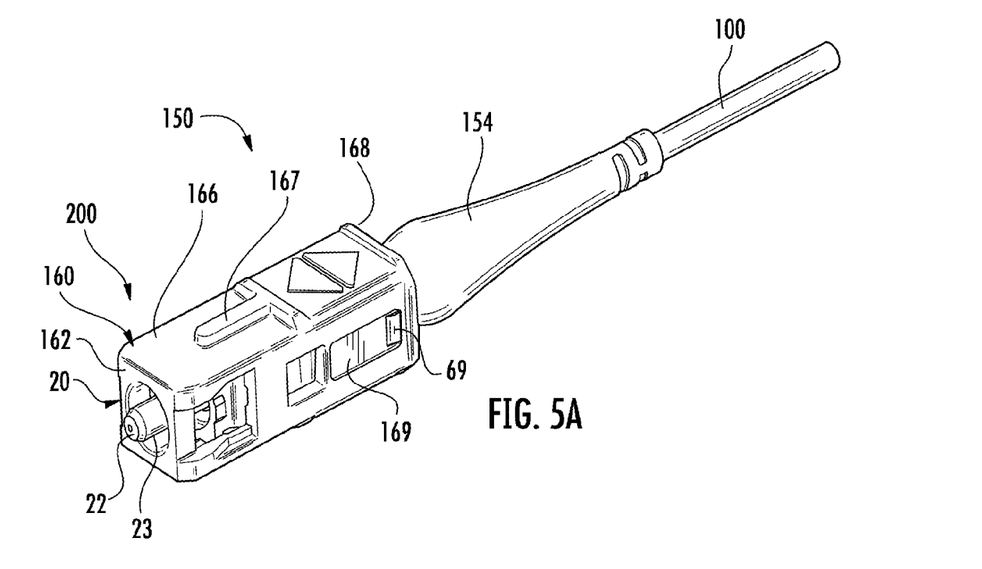
FIGS. 5A and 5B are perspective views of an example cable assembly having an the outer housing received on the inner housing of the connector sub-assembly of FIG. 1 to form an optical fiber connector, with FIG. 5A showing the outer housing in a non-retracted position and FIG. 5B showing a close up of the optical fiber connector with the outer housing in a retracted position that exposes more of the ferrule front-end section.
Figure 5B:
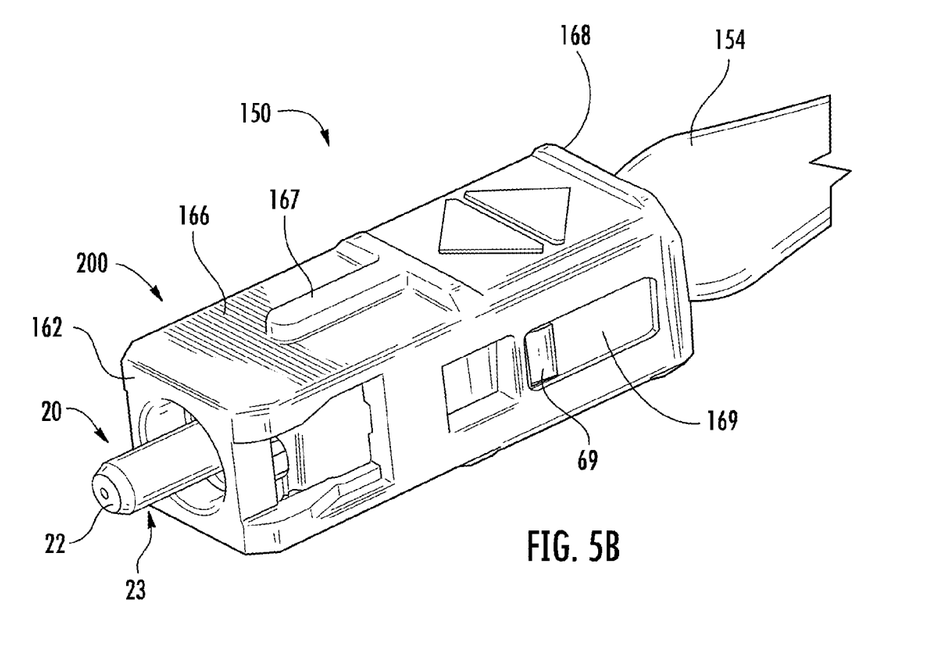

FIG. 5A is a perspective view of a cable assembly 150 formed by operably disposing an outer housing 160 on inner housing 60 of cable sub-assembly 110. The combination of outer housing 160, inner housing 60, and ferrule 20 define a tunable connector 200 on cable assembly 150. In an example, outer housing 160 is retractable relative to inner housing 60 to define retracted and non-retracted positions of the outer housing. In FIG. 5A, outer housing 160 is in a non-retracted position relative to inner housing 60. FIG. 5B is similar to FIG. 5A and shows cable assembly 150 with outer housing 160 of connector 200 in the retracted position relative to inner housing 60 so that more of ferrule 20 is accessible, i.e., more of the ferrule extends from a front end 162 of outer housing 160 in the retracted position than in the non-retracted position. In an example, ferrule 20 extends between 150% and 250% farther from front end 162 of outer housing 160 when the outer housing is in the retracted position as compared to the non-retracted position.

Figure 5C:
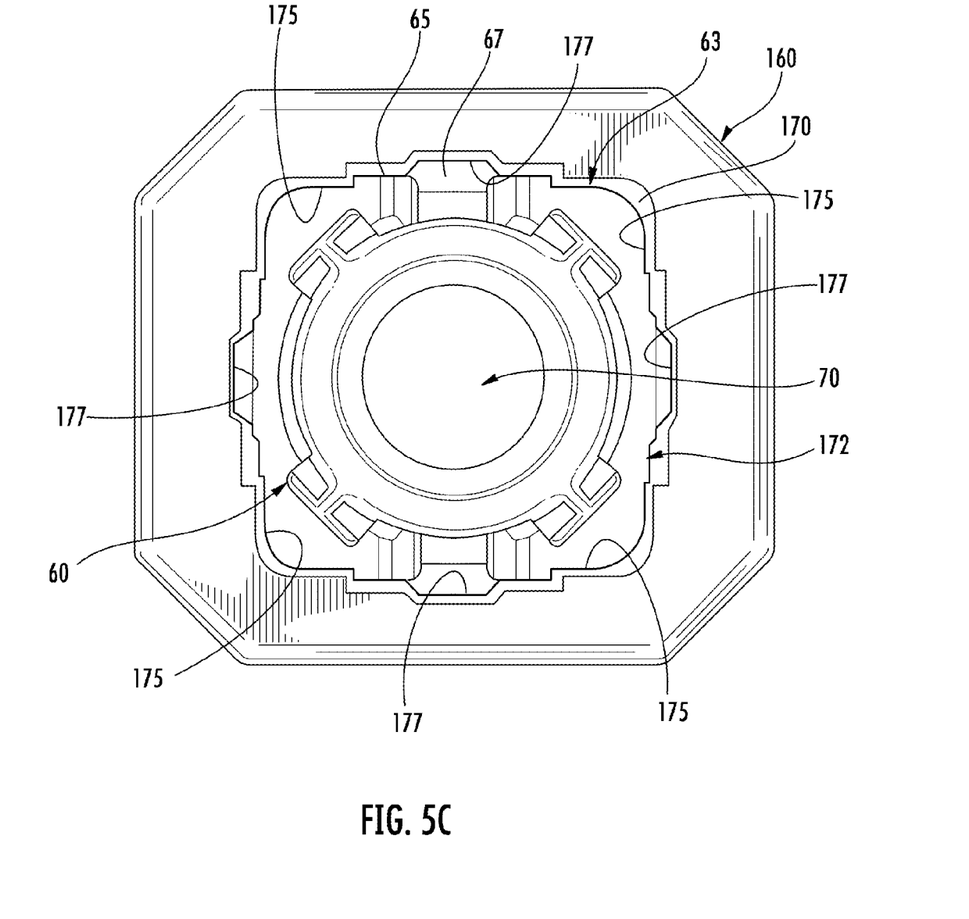
FIG. 5C is a front elevation view of the inner and outer housings of the optical fiber connector of FIG. 5A, illustrating how the inner housing can reside within an interior of the outer housing in one of four different orientations due to four-fold symmetry.

The cable assembly 150 includes an optional flexible protective member 154 (e.g., a boot) arranged over the crimp band 112 and jacket-retention member 144. FIG. 5C is a front elevation view of outer housing 160 surrounding inner housing 60 when the inner and outer housings are operably engaged.

With reference to FIGS. 5A through 5C, outer housing 160 includes front end 162, an upper surface 166 that includes an outer keying feature 167, and a back end 168. In an example, keying feature 167 is in the form of a protrusion, such as a tongue configured to engage a groove of another housing (not shown). The outer housing 160 also includes an interior 170 defined by four inner walls 175 that define a substantially square cross-sectional shape of the interior. The inner walls 175 respectively include alignment features 177 that are complementary to alignment features 67 on inner housing 60. Thus, in an example, alignment features 177 are recesses sized to receive and closely engage the protrusions that define alignment features 67. This quad-symmetric configuration of inner walls 175 of interior 170 allows inner housing 60 to be closely received and engaged in interior 170 of outer housing 160 in one of four possible orientations. A retention opening 169 resides adjacent back end 168 of outer housing 160 and is configured to receive and engage retention member 69 of inner housing 60 when the inner housing is inserted into interior 170 of outer housing 160.

The outer housing 160 should engage inner housing 60 of cable sub-assembly 110 in a manner that provides the best optical coupling (i.e., the highest coupling efficiency or the lowest insertion loss) for the resulting cable assembly 150. Thus, as discussed above, prior to installing outer housing 160 on inner housing 60 to form connector 200, it can be first determined in which quadrant Q core 46 resides. This involves a measurement of the core-to-ferrule concentricity. As noted above, to date such measurements have proven problematic when trying to perform the measurements on cable sub-assembly 110 because not enough of the ferrule outer surface 26 is exposed.

Measuring the Core-to-Ferrule Concentricity

As noted above, the example cable sub-assembly 110 shown in FIG. 4A provides access to the ferrule outer surface 26 to allow for measurements of location of core 46 to be made relative to the true ferrule center, i.e., to measure the core-ferrule concentricity. In an example, measurement of the core-ferrule concentricity is made using a non-contact core-ferrule concentricity measurement system such as disclosed in U.S. Patent Application Publication No. 2015/0177097 ("the '097 Publication"), which is incorporated herein by reference. It is noted that such non-contact measurements are made with increasing accuracy if more of ferrule outer surface 26 is exposed because the distance sensors can be used to measure the ferrule outer surface at more that one axial location.

Figure 6A:
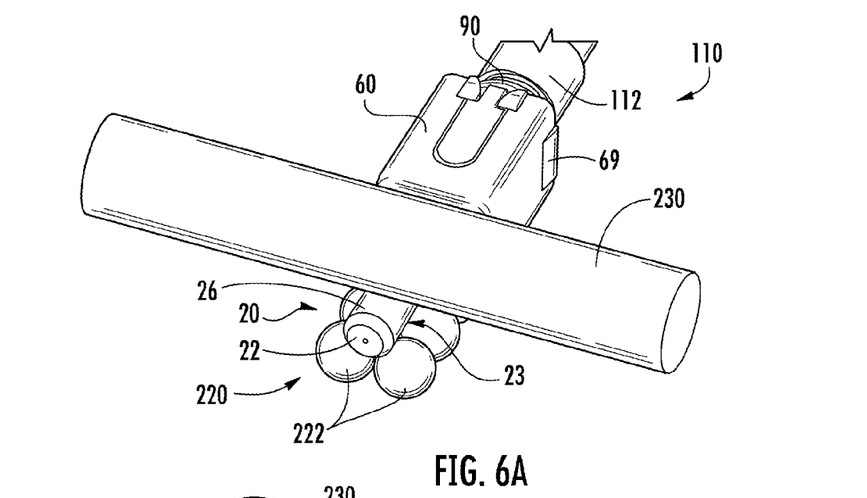
FIGS. 6A through 6C are perspective, side elevation, and front elevation views, respectively, of an example contact measurement device for measuring core-ferrule concentricity of the cable sub-assembly of FIG. 4A by engaging the front-end section of the ferrule with a ball array.
Figure 6B:
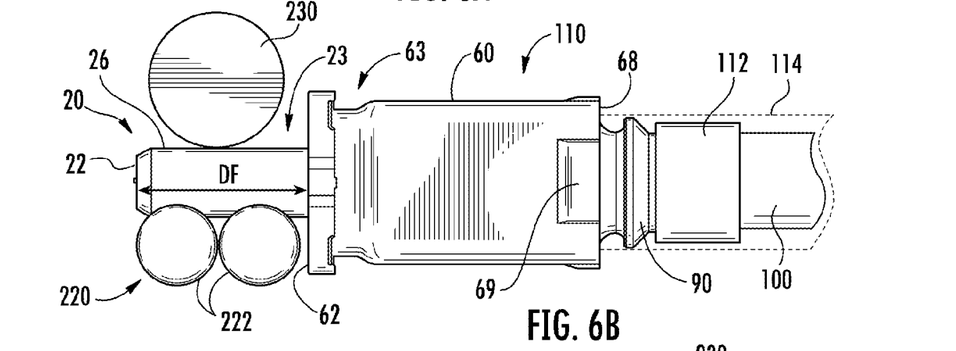
Figure 6C:
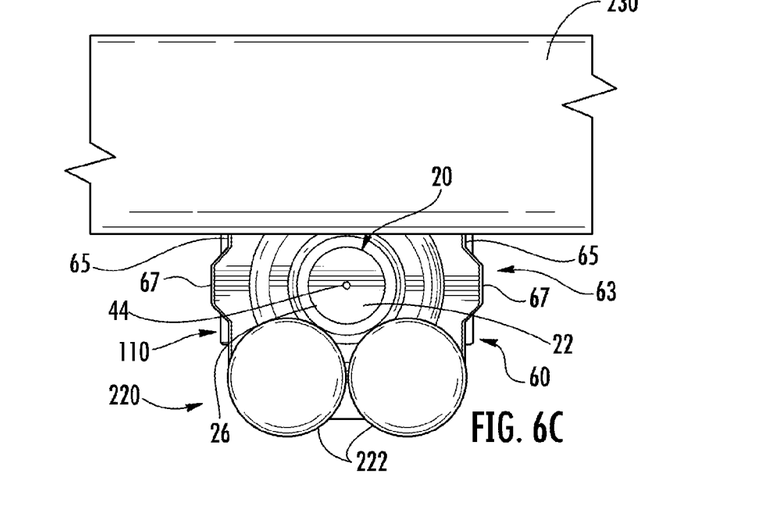

In another example illustrated in FIGS. 6A through 6C, the core-ferrule concentricity is measured using a contact method that does not utilize a master connector (i.e., a reference connector) to establish an optical connection. In an example of such a method, ferrule 20 of cable sub-assembly 110 is disposed on a ball array 220 formed by four precision balls 222 arranged as shown in FIG. 6A. Each precision ball 222 has a diameter of about 3 mm and is made either of carbide, sapphire, or synthetic ruby.

The four precision balls 222 in ball array 220 provide a first 2-point contact on a forward portion of ferrule outer surface 26 and a second 2-point contact on a rearward portion of the ferrule outer surface. A rod 230 is used to apply a downward force on ferrule 20 to seat the ferrule within ball array 220. The ferrule 20 is then manually or automatically rotated within ball array 220 while ferrule outer surface 26 remains in contact with precision balls 222.

During rotation of ferrule 20, a core sensor such as disclosed in the aforementioned '097 Publication, determines the magnitude and direction of the core offset. It is noted that in this contact method, a substantial portion of ferrule 20 needs to extend beyond the front end 62 of inner housing 60 in order for the ferrule to properly rest within ball array 220. In one example, the distance DF is at least 6 mm and further in an example is between 6 mm and 10 mm, while in another example as discussed above, the distance DF is in the range $dF \leq DF \leq 4 \cdot dF$.

Figure 7A:
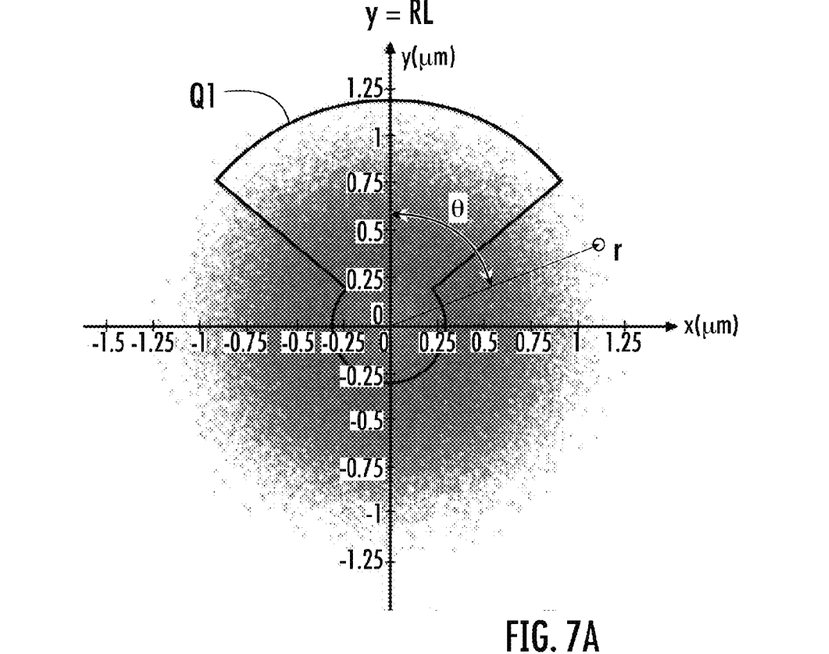
FIG. 7A is a scatter plot of core-ferrule concentricity based on Monte Carlo simulations, illustrating a substantially uniform distribution of core-ferrule concentricity measurements with angle (i.e., about the z-axis), and showing an example first quadrant Q1.

FIG. 7A is a scatter plot of the core-to-ferrule concentricity. The points in the scatter plot have (r, θ) coordinates, wherein r coordinate is the magnitude of the core offset measured relative to the ferrule center, while the θ coordinate shows the angular direction of the offset relative to a reference line RL. Cartesian x and y axes are also shown, with the units in microns (μm). The first quadrant Q1 is shown in the plot for reference.

The data points in the plot were created using a Monte-Carlo simulation of core-ferrule concentricity based on three major sources of error: a core/cladding offset in the optical fiber; an offset of the bare fiber section within the axial bore; and an offset of the axial bore relative to the true ferrule center. The plot shows a relatively uniform distribution of the data with angular coordinate θ. As can be seen from the plot of FIG. 7A, the position of core 46 will fall into one of the four quadrants Q associated with inner housing 60.

Thus, once the location of core 46 in a given quadrant Q is determined, the question becomes what orientation should outer housing 160 have relative to inner housing 60 in order to tune the resulting connector 200, i.e., to increase or maximize the coupling efficiency or to reduce or minimize the insertion loss of the resulting cable assembly 150. If the orientation of outer housing 160 relative to the inner housing 60 is made random when forming a set of cable assemblies 150, the coupling efficiency between any two pairs of the cable assemblies in the set will vary over a relatively large range. As can be seen in the plot of FIG. 7A, this is because the core locations can range from being in the same quadrant, which results in a relatively high coupling efficiency, to being in opposite quadrants that results in a relatively low coupling efficiency.

Figure 8A:
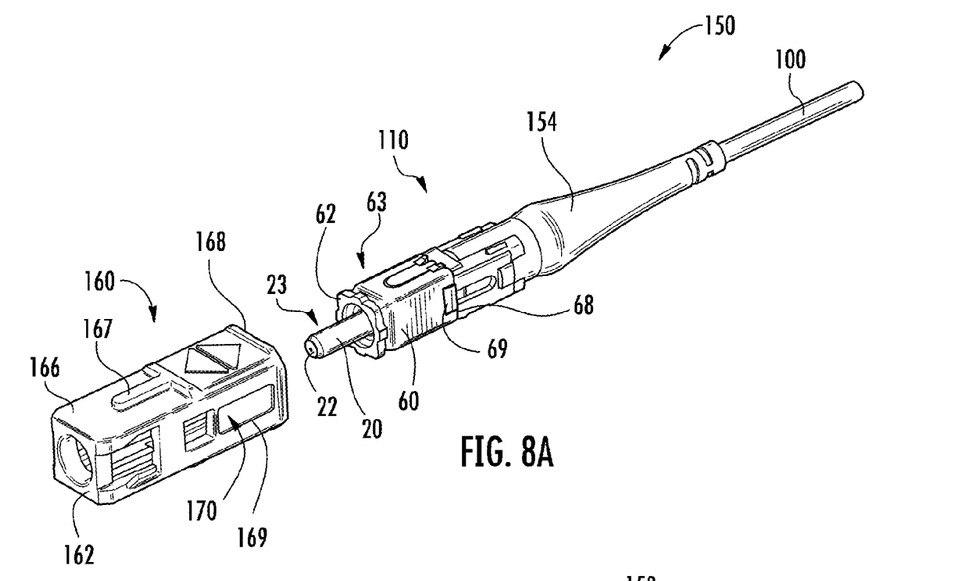
FIGS. 8A and 8B are perspective views showing an outer housing being operably engaged with respect to the inner housing on the cable sub-assembly of FIG. 1 to form a cable assembly, wherein the outer housing has a select orientation, and wherein the quadrant that includes the core location of the optical fiber is closest to a keying feature of the outer housing.
Figure 8B:
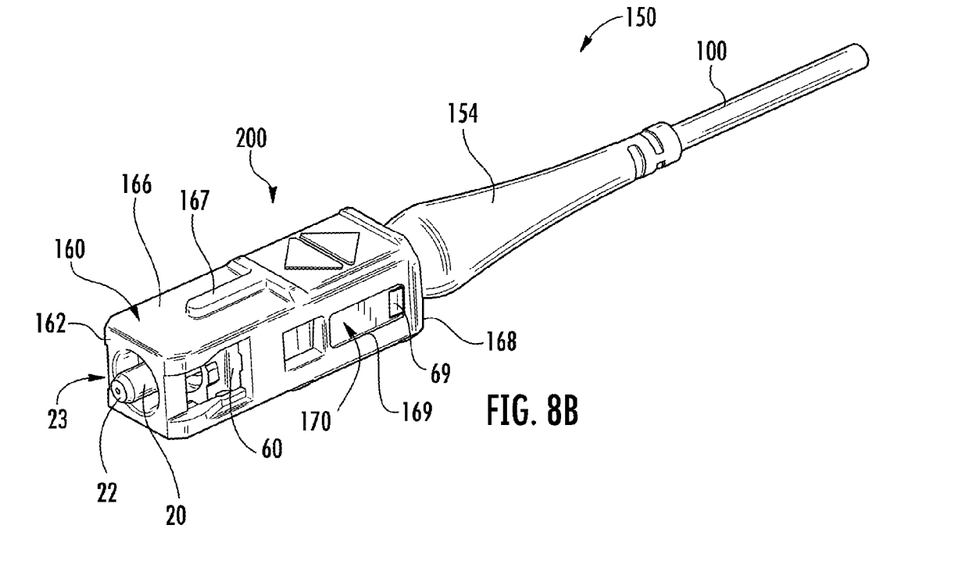

Thus, in order to maximize the coupling efficiency for a set of cable assemblies 150, each cable assembly has a tuned configuration whereby inner housing 60 and outer housing 160 are operably engaged so that the quadrant Q in which core 46 is located is in the same position relative to the outer housing, e.g., immediately adjacent (i.e., closest to) outer keying feature 167. FIGS. 8A and 8B are perspective views showing the method of adding outer housing 160 to inner housing 60 on cable sub-assembly 110 to form a tuned cable assembly 150.

Figure 7B:
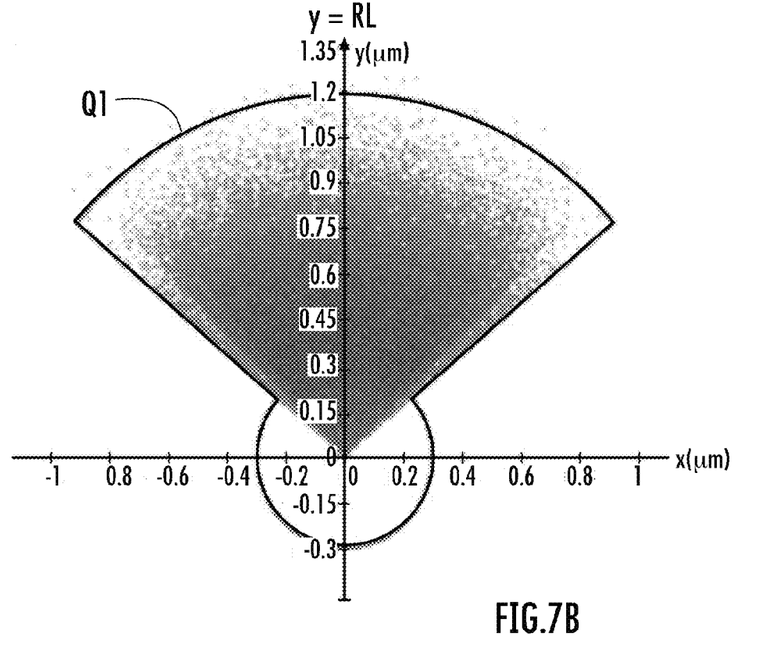
FIG. 7B is a scatter plot of the core-ferrule concentricity for tuned optical fiber connectors, wherein the outer housing is oriented with respect to the inner housing of each optical fiber connector so that the core locations of the respective optical fibers are all located in the first quadrant.

This tuning method gives rise to the scatter plot of FIG. 7B, wherein all of the locations of core 46 can be considered to effectively reside in a single quadrant Q, e.g., quadrant Q1 as shown. This means that for any pair of cable assemblies 150, the optical connection established between respective connectors 200 will have a greater coupling efficiency on average than in the case where inner and outer housings 60 and 160 are engaged without regard to the core location, i.e., in a non-tuned configuration. This is because the core locations, on average, will be closer together in the tuned configuration as compared to the non-tuned configuration.

It will be apparent to those skilled in the art that various modifications to the preferred embodiments of the disclosure as described herein can be made without departing from the spirit or scope of the disclosure as defined in the appended claims. For example, in alternative embodiments, inner housing 60 may have more than four-fold symmetry about the housing axis A2, and outer housing 160 may be configured to receive and engage inner housing 60 in more than four possible orientations. Alternatively or additionally, sides 65 of inner housing 60 and interior 170 of outer housing 170 may be configured to provide the different orientations without complementary alignment features. The sides 65 also need not be substantially identical in some embodiments. Indeed, outer housing 160 may even be configured to receive inner housing 60 in different orientations without there being symmetry of the inner housing about housing axis A2.

As can be appreciated, the disclosure covers the modifications and variations provided they come within the scope of the appended claims and the equivalents thereto.

What is claimed is:

1. A tunable optical fiber connector for use with an optical fiber cable that supports an optical fiber, comprising:
    a ferrule having a front end, a back end, a length LF, an outer surface, and an axial bore configured to operably support a bare fiber portion of the optical fiber;
    an inner housing having an interior and a front-end section that defines a front end of the inner housing, wherein the interior of the inner housing operably supports the ferrule so that that the front end of the ferrule extends beyond the front end of the inner housing by a distance DF, wherein $0.35 \cdot LF \leq DF \leq 0.5 \cdot LF$; and an outer housing having interior configured to receive the inner housing in one of at least four possible orientations of the inner housing relative to a longitudinal axis of the optical fiber connector.

2. The tunable optical fiber connector according to claim 1, wherein the front-end section of the inner housing includes at least four sides configured to cooperate with the interior of the outer housing to define the at least four possible orientations.

3. The tunable optical fiber connector according to claim 2, wherein the at least four sides of the inner housing render the front-end section of the inner housing at least four-fold symmetric relative to the longitudinal axis.

4. The tunable optical fiber connector according to claim 3, wherein the at least four sides of the inner housing are substantially identical.

5. The tunable optical fiber connector according to claim 2, wherein each of the at least four sides includes a first alignment feature, and wherein the interior of the outer housing includes second alignment features complimentary to the first alignment features.

6. The tunable optical fiber connector according to claim 1, wherein the front-end section of the inner housing includes a flange that defines the front end of the inner housing and that is configured to cooperate with the interior of the outer housing to define the at least four possible orientations.

7. The tunable optical fiber connector according to claim 6, wherein the flange of the inner housing has at least four sides.

8. The tunable optical fiber connector according to claim 1, wherein the outer housing is axially retractable relative to the inner housing to define [a] retracted and non-retracted positions, and wherein the ferrule extends farther from a front end of the outer housing in the retracted position than in the non-retracted position.

9. The tunable optical fiber connector according to claim 8, wherein the ferrule extends between 150% and 250% farther from the front end of the outer housing when the outer housing is in the retracted position as compared to the non-retracted position.

10. A cable assembly including the tunable optical fiber connector according to claim 1, the cable assembly comprising:

an optical fiber cable that supports an optical fiber;

wherein the tunable optical fiber connector is installed on the optical fiber cable, and wherein a bare fiber portion of the optical fiber is supported by the axial bore of the ferrule.

11. A method of tuning an optical fiber connector for use with an optical fiber cable that supports an optical fiber having a core, comprising:

(a) operably supporting a ferrule in an interior of an inner housing, the ferrule having a length LF, an outer surface, and an axial bore that operably supports a bare fiber portion of the optical fiber, wherein a front end of the ferrule extends beyond the inner housing by a distance DF to define a front-end section of the ferrule, and wherein $0.35 \cdot LF \leq DF \leq 0.5 \cdot LF$;

(b) performing a measurement of a position of the core of the optical fiber relative to a center of the ferrule using the front-end section of the ferrule; and (c) receiving the inner housing in an interior of an outer housing to form the optical fiber connector, wherein the inner housing is received in the interior of the outer housing in one of at least four possible orientations relative to a longitudinal axis of the optical fiber connector, and wherein the one orientation is selected such that the position of the core of the optical fiber is closest to a keying feature of the outer housing.

12. The method according to claim 11, wherein the act (b) of performing the measurement includes performing a non-contact core-ferrule concentricity measurement.

13. The method according to claim 11, wherein the act (b) of performing the measurement includes performing a contact measurement using a ball array that contacts the outer surface of the ferrule at the front-end section of the ferrule.

14. The method according to claim 11, wherein the act (b) of performing the measurement includes performing a contact measurement without forming an optical connection between a master connector and the optical fiber connector.

15. An optical fiber connector sub-assembly for use with an optical fiber cable that supports an optical fiber having a core, comprising:

a ferrule having a front end, a back end, a length LF, an outer surface, and an axial bore configured to operably support a bare fiber portion of the optical fiber; and an inner housing having an interior and a front-end section that defines a front end of the inner housing, wherein the interior of the inner housing operably supports the ferrule so that that the front end of the ferrule extends beyond the front end of the inner housing by a distance DF, wherein $0.35 \cdot LF \leq DF \leq 0.5 \cdot LF$.

16. A cable sub-assembly including the optical fiber connector sub-assembly according to claim 15, the cable sub-assembly also including an optical fiber cable that supports an optical fiber, wherein the optical fiber connector sub-assembly is installed on the optical fiber cable; and a bare fiber portion of the optical fiber is supported by the axial bore of the ferrule.

17. The optical fiber connector sub-assembly according to claim 15, wherein the front-end section of the inner housing includes at least four sides that render the front-end section of the inner housing at least four-fold symmetric relative to a longitudinal axis of the optical fiber connector sub-assembly.

18. The optical fiber connector sub-assembly according to claim 17, wherein the at least four sides of the inner housing are substantially identical.

19. A cable assembly including the optical fiber connector sub-assembly according to claim 17, the cable assembly also including an optical fiber cable that supports an optical fiber, wherein:

the optical fiber connector sub-assembly is installed on the optical fiber cable;

a bare fiber portion of the optical fiber is supported by the axial bore of the ferrule; and the optical fiber connector sub-assembly further includes an outer housing having interior that receives the front-end section of the inner housing in one of at least four possible orientations.

20. The method according to claim 11, wherein the outer housing is retractable relative to the inner housing to define a retracted position and a non-retracted position wherein more of the ferrule extends from a front end of the outer housing in the retracted position than in the non-retracted position.

21. The optical fiber connector sub-assembly according to claim 15, further comprising:
an outer housing operably disposed on the inner housing, wherein the outer housing is retractable relative to the inner housing to define a retracted position and a non-retracted position wherein more of the ferrule extends from a front end of the outer housing in the retracted position as compared to the non-retracted position.

22. The optical fiber connector sub-assembly according to claim 21, wherein the ferrule extends between 150% and 250% farther from the front end of the outer housing when the outer housing is in the retracted position as compared to the non-retracted position.

* * * * *

UNITED STATES PATENT AND TRADEMARK OFFICE
CERTIFICATE OF CORRECTION

PATENT NO. : 9,964,710 B2
APPLICATION NO. : 15/455414
DATED : May 8, 2018
INVENTOR(S) : Joel Christopher Rosson Page 1 of 1

It is certified that error appears in the above-identified patent and that said Letters Patent is hereby corrected as shown below:

In the Claims

In Column 9, Line 1, Claim 1, delete "that that" and insert -- that --, therefor.

In Column 10, Line 29, Claim 15, delete "that that" and insert -- that --, therefor.

In Column 10, Line 36, Claim 16, delete "wherein" and insert -- wherein: --, therefor.

Signed and Sealed this
Fifth Day of May, 2020

Andrei Iancu
*Director of the United States Patent and Trademark Office*